United States Patent
Lerner

(10) Patent No.: US 7,103,071 B1
(45) Date of Patent: Sep. 5, 2006

(54) COMMUNICATION PROTOCOL FOR THE BROADCAST OF FIRST/LAST EVENT DETECTION OVER A SINGLE COMMUNICATION CHANNEL

(75) Inventor: Abner Lerner, Apple Valley, MN (US)

(73) Assignee: Cypress Semiconductor Corp., San Jose, CA (US)

( * ) Notice: Subject to any disclaimer, the term of this patent is extended or adjusted under 35 U.S.C. 154(b) by 648 days.

(21) Appl. No.: 09/822,979

(22) Filed: Mar. 30, 2001

(51) Int. Cl.
*H04J 3/06* (2006.01)
(52) U.S. Cl. .................................... 370/503
(58) Field of Classification Search ............... 370/231, 370/235, 236, 251, 270, 394, 423, 438, 489, 370/490
See application file for complete search history.

(56) References Cited

U.S. PATENT DOCUMENTS

| | | | | |
|---|---|---|---|---|
| 5,522,088 A | * | 5/1996 | Halma et al. | 370/516 |
| 5,790,829 A | * | 8/1998 | Flynn | 714/39 |
| 5,923,662 A | * | 7/1999 | Stirling et al. | 370/432 |
| 6,493,034 B1 | * | 12/2002 | Elberbaum | 370/519 |
| 2002/0057717 A1 | * | 5/2002 | Mallory | 370/503 |

* cited by examiner

*Primary Examiner*—Chi Pham
*Assistant Examiner*—Anh-Vu Ly
(74) *Attorney, Agent, or Firm*—Christopher P. Maiorana, PC

(57) ABSTRACT

An apparatus comprising one or more stations. Each of the one or more stations may be configured to receive a signal from a communication channel. The signal generally comprising event detection information. The one or more stations may be configured to share the event detection information.

19 Claims, 6 Drawing Sheets

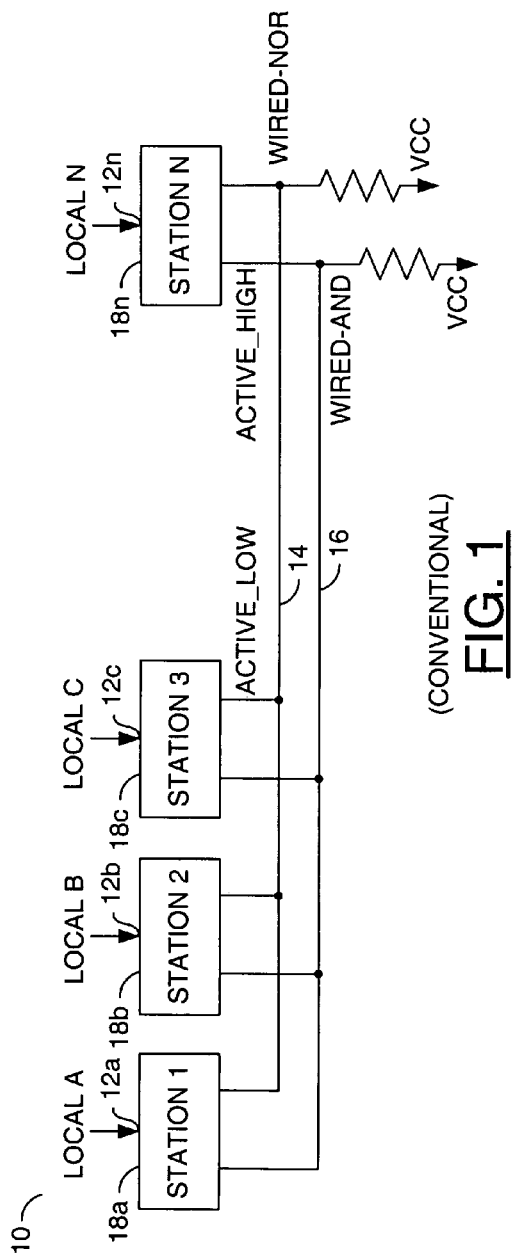
FIG. 1 (CONVENTIONAL)

COMMUNICATION PROTOCOL FOR THE BROADCAST OF FIRST/LAST EVENT DETECTION OVER A SINGLE COMMUNICATION CHANNEL

FIELD OF THE INVENTION

The present invention relates to a method and/or architecture for a communication protocol generally and, more particularly, to a method and/or architecture for a communication protocol for the broadcast of first/last event detection over a single communication channel.

BACKGROUND OF THE INVENTION

A conventional approach for implementing a communication protocol is shown in the circuit 10 of FIG. 1. The circuit 10 illustrates a protocol using a channel for the transmission of electrical signals. The circuit 10 comprises a number of stations 12a–12n. A station is defined as an entity capable of transmitting/receiving information, detecting an external event and acting upon the event (i.e., performing a communication protocol) The circuit 10 also has a first communication channel 14 and a second communication channel 16. Each one of the stations 12a–12n has an input 18a–18n that receives a local event signal LOCALa–LOCALn. The stations 12a–12n are configured to detect a local event on each respective local event line LOCALa–LOCALn. The stations 12a–12n present a signal on the first and second communication channels 14 and 16 in response to the local events LOCALa–LOCALn. Additionally, one of the communication channels 14 or 16 contains information about a first local event detected. The other one of the communication channels 14 or 16 contains information about a last local event detected.

The communication channel 14 performs a wired-NOR function, thereby carrying information about the detection of the first event. The second communication channel 16 performs a wired-AND function, thus carrying information about the detection of the last event.

The disadvantage of such a conventional method is the use of the multiple shared communication channels 14 and 16. The circuit 10 typically requires additional hardware resources to implement the two communications channels 14 and 16. The additional hardware resources are required in order for the communication protocol 10 to function properly.

SUMMARY OF THE INVENTION

The present invention concerns an apparatus comprising one or more stations. Each of the one or more stations may be configured to receive a local event or a signal from a communication channel. The signal generally comprises timing information. The one or more stations may be configured to share the event detection information.

The objects, features and advantages of the present invention include providing a method and/or architecture for implementing a communication protocol that may (i) allow a group of synchronous stations to broadcast timing information related to the detection of a first and a last synchronous local event to other stations, (ii) allow a single shared communication channel to broadcast timing information to peer stations and/or (iii) minimize a number of communication channels required for broadcast of information.

BRIEF DESCRIPTION OF THE DRAWINGS

These and other objects, features and advantages of the present invention will be apparent from the following detailed description and the appended claims and drawings in which:

FIG. 1 is a block diagram of a conventional communication protocol for the broadcast of first/last event detection using an electrical communication channel;

DETAILED DESCRIPTION OF THE PREFERRED EMBODIMENTS

Figure 2:
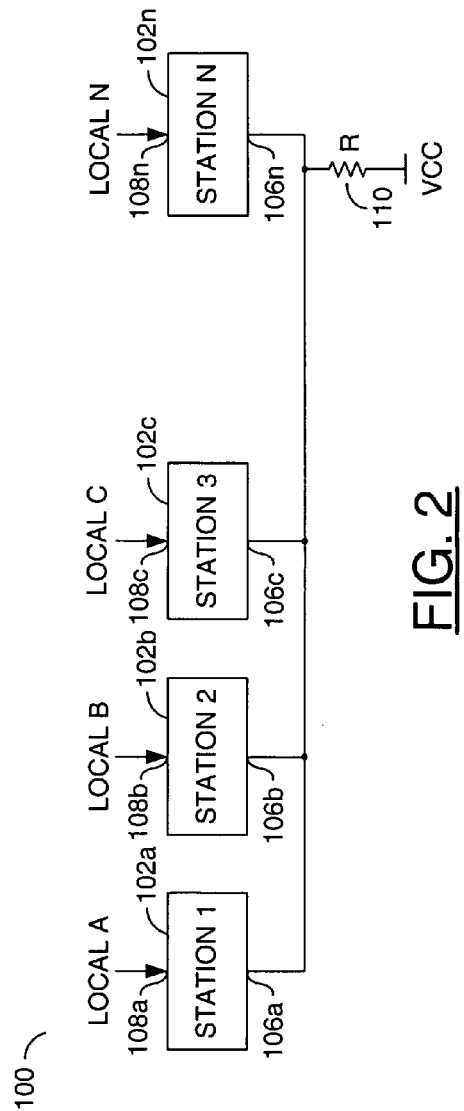
FIG. 2 is a block diagram of a preferred embodiment of the present invention.

Referring to FIG. 2, a block diagram of a circuit (or system) 100 is shown in accordance with a preferred embodiment of the present invention. The structure of the circuit 100 generally comprises a number of stations 102a–102n (where n is an integer) and a communication channel 104. In one example, the communication channel 104 may be implemented as an electrical communication channel. Each of the stations 102a–102n may have an input/output 106a–106n that may be connected to the communication channel 104. In one example, the stations 102a–102n may be implemented as synchronous stations. In another example, the stations 102a–102n may be implemented as peer (e.g., singular, independently operated) stations. In another example, the communication channel 104 may be implemented as a shared communication channel (SCC). However, the stations 102a–102n and the communication channel 104 may be implemented as other appropriate stations and/or channels in order to meet the design criteria of a particular implementation.

The circuit 100 may provide a mechanism that may allow a group of synchronous stations (e.g., the stations 102a–102n) to broadcast timing information related to the detection of a first and a last synchronous local event to the other synchronous stations 102a–102n. The circuit 100 may also minimize the number of communication channels required for a communication protocol (e.g., required for the broadcast of information).

Each of the stations 102a–102n may have an input 108a–108n that may receive a signal (e.g., LOCALa–LOCALn). In one example, the signals LOCALa–LOCALn may be implemented as synchronous local events. The circuit 100 may allow the group of synchronous stations 102a–102n to communicate timing information related to the detection of the synchronous local events LOCALa–LOCALn to the other synchronous stations 102a–102n. Additionally, the circuit 100 may allow the synchronous stations 102a–102n to communicate over a single shared communication media (e.g., the SCC 104). Additionally, the communication channel 104 may be coupled to a first side of a resistor 110. The resistor 110 may have a resistive value (e.g., R).

The arrival of the local event LOCALa–LOCALn is generally assumed to occur infrequently for each station, relative to the time of arrival of the events across the stations in the system. The stations 102a–102n may be configured to detect the local events LOCALa–LOCALn presented to each station 102a–102n, within a certain span of time. Additionally, the stations 102a–102n may communicate the first and last local events LOCALa–LOCALn via the SCC 104. Each station 102a–102n may be required to know an exact moment (e.g., time) when both the first and the last synchronous local events LOCALa–LOCALn occur via the SCC 104. The first and last local events generally occur at different stations 102a–102n.

The system 100 may also be implemented to determine if the stations 102a–102n have detected the local event LOCALa–LOCALn within a predetermined time. For example, each of the stations 102a–102n may open a time window of a predetermined length (e.g., T time units), upon the detection of the first event on the SCC 104. The last event is then expected to be detected before the time window expires, T time units later.

Figure 3:
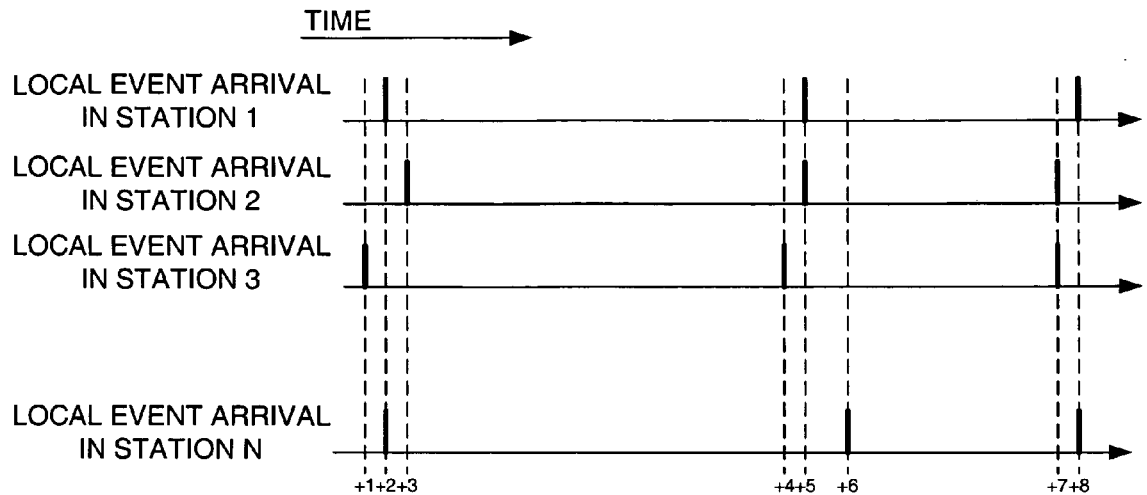
FIG. 3 is a graph illustrating an operation of the present invention.

Referring to FIG. 3, a typical local event arrival time line is shown. FIG. 3 may illustrate a typical pattern of arrival for a series of events to a number of stations. Initially, no event may be detected by any of the stations 102a–102n present in the system 100. Since no event has been detected, the stations 102a–102n may remain passive (e.g., do not drive the SCC 104). An assertion of the SCC 104 by any of the stations 102a–102n may indicate the timing of the first local event within the system.

At a first time (e.g., t1) the station 102c may receive a local event. The event received at the station 102c may be a first local event. At a second time (e.g., t2) the station 102a may receive a local event and the station 102n may receive a local event. At a third time (e.g., t3) the station 102b may receive a local event. The event received at the station 102b may be a last local event.

At a fourth time (e.g., t4) the station 102c may receive a local event. The event received at the station 102c may be a first local event. At a fifth time (e.g., t5) the station 102a may receive a local event and the station 102b may receive a local event. At a sixth time (e.g., t6) the station 102n may receive a local event. The event received at the station 102n may be a last local event.

At a seventh time (e.g., t7) the station 102b may receive a local event and the station 102c may receive a local event. The events received at the station 102b and the station 102c may be first local events. At an eighth time (e.g., t8) the station 102a may receive a local event and the station 102n may receive a local event. The events received at the station 102a and the station 102n may be last local events.

Figure 4:
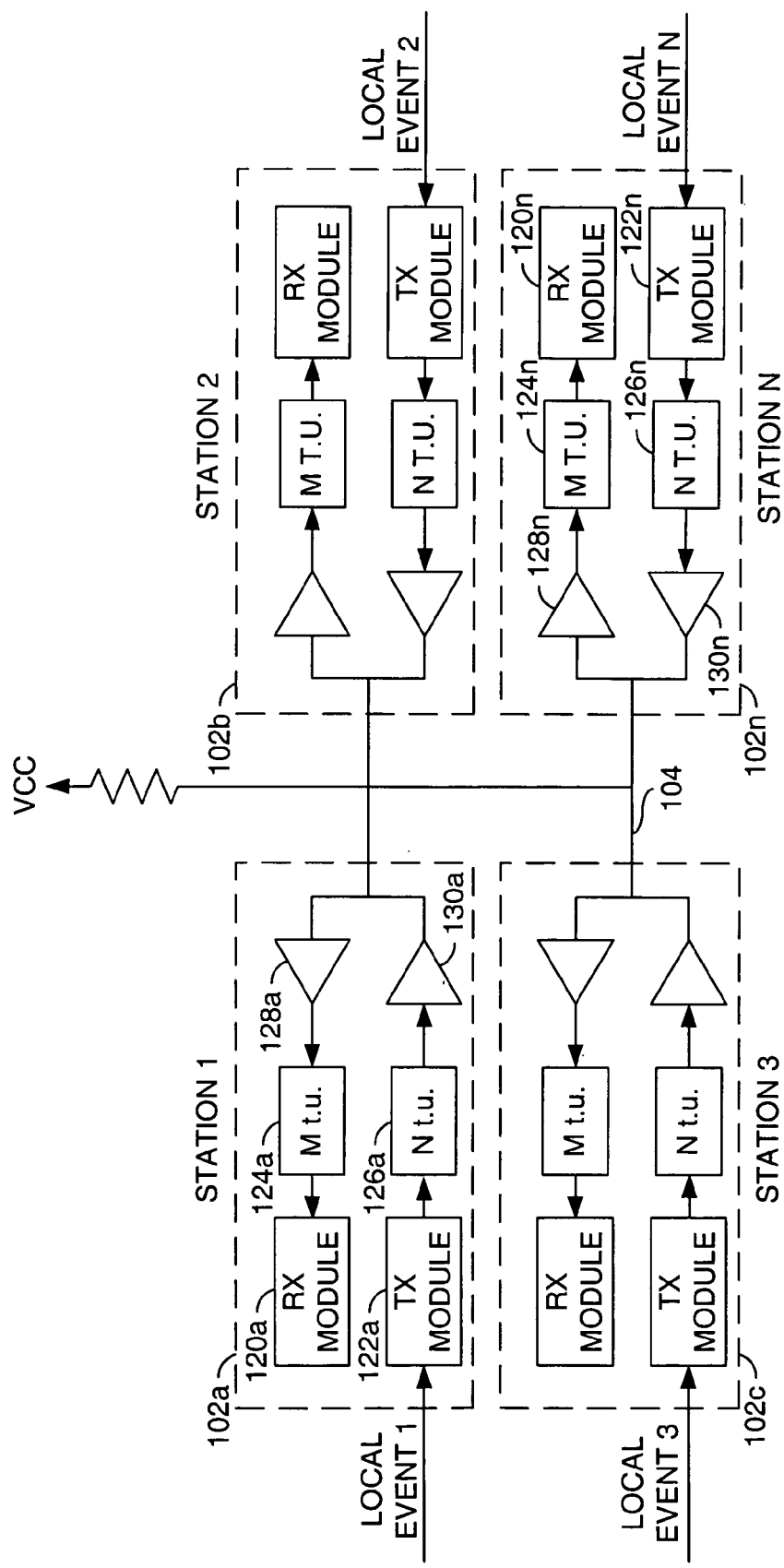
FIG. 4 is a detailed block diagram of the present invention.

Referring to FIG. 4, a more detailed diagram of the system 100 is shown. FIG. 4 may illustrate a typical implementation of a station. Each of the stations 102a–102n generally comprises a receive module 120a–120n, a transmit module 122a–122n, a time delay block (or circuit) 124a–124n and a time delay block (or circuit) 126a–126n. A buffer 128a–128n generally receives the signal from the communication channel 104 and a buffer 130a–130n generally presents information to the communication channel 104.

In one example, the blocks 124a–124n may be implemented as receive time delay circuits and the blocks 126a–126n may be implemented as transmit time delay circuits. The receive time delay circuits 124a–124n may have a delay time of M. The transmit time delay circuits 126a–126n may have a delay time of N, where M and N are integers that may be the same or different. In one example, M may be the number of time units (or clock cycles, since the communication is generally synchronous) required for a broadcast signal (e.g., along the SCC 104) to propagate from the SCC 104 to the receiving module 120a–120n of a particular one of the stations 102a–102n. In another example, N may be the number of time units required for the broadcast signal to propagate from the transmitting module 122a–122n of a particular one of the stations 102a–102n to the SCC 104. Furthermore, the propagation delay through the SCC 104 between any two of the stations 102a–102n may be less than 1 time unit.

A first station (e.g., 102a) may detect a local event via the event LOCALa that may drive the SCC 104 for a predefined period (e.g., M+N) time units. The predefined period may assure that the SCC 104 remains active until the communication protocol is fully resolved.

The initial act of driving the SCC 104 may carry information for an exact timing of the first event (e.g., LOCALa) that may be detected by the system 100. The initial driving of the SCC 104 may reach all of the receiving modules 120a–120n of the 1 stations 102a–102n at the same time. For example, the initial drive may reach each of the stations 102a–102n (M+N) time units later.

If a station (e.g., 102b) receives a local event (e.g., signal LOCALb) before the (M+N) time units expire, the station 102b may also attempt to drive the SCC 104. However, the station 102b may receive an active signal from the receiving module 120b sooner than (M+N) time units after the station 102a drove the SCC 104. The station 102b may be informed that the event LOCALb may not be the first local event of the system 100. If the station 102b is informed that local event LOCALb is not the first local event, the station 102b may immediately become passive and release the SCC 104.

If another station (e.g., 102c) receives an active signal in the receiving module 120c and has not yet detected a local event on the SCC 104, the station 102c may immediately become active by driving the SCC 104. As soon as the local event is detected by the receive module 120c of the station 102c, the station 102c may become passive by releasing the SCC 104. Eventually, all the stations 102a–102n may receive the notification of local events (via the SCC 104). The stations 102a–102n may then cause a complete release of the SCC 104, thus ending the protocol.

The time of which the release of the SCC 104 is detected carries the information regarding when the last station 102a–102n received the local event. The resolution time of the communication protocol may be directly proportional to the maximum skew allowed for the arrival of the local events LOCALa–LOCALn, and the inherent latencies M and N of each station 102a–102n. The circuit 100 may provide a timeout embedded in the protocol that may constrain the maximum skew among the local events LOCALa–LOCALn. Once the protocol timeout expires, all the stations 102a–102n may become passive and release the SCC 104 in order to wait for the next set of local events to arrive.

Figure 5:
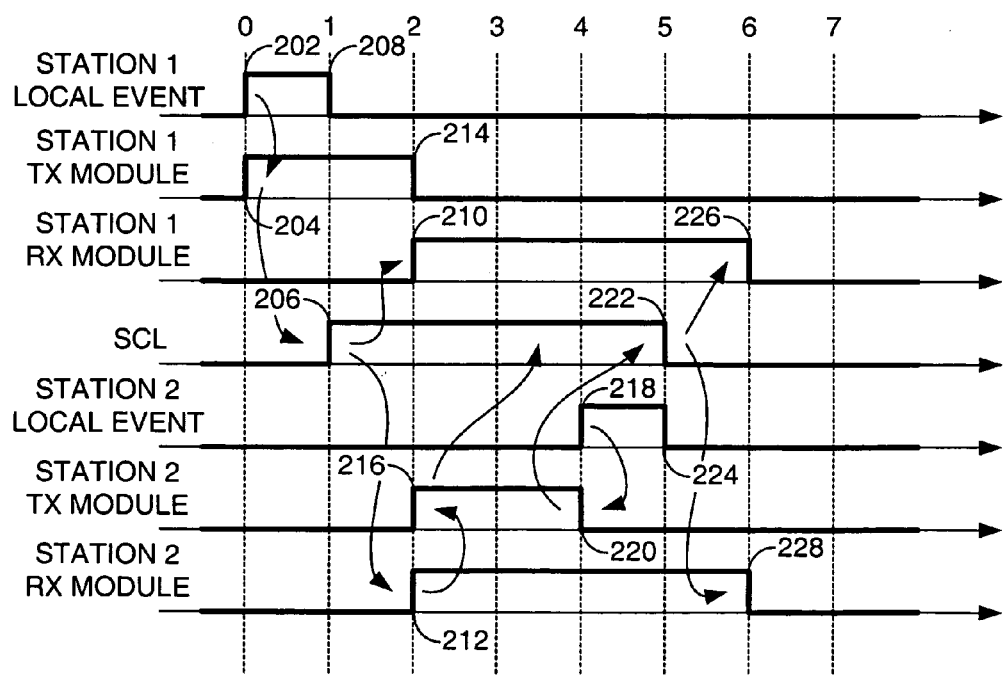
FIG. 5 is a timing diagram illustrating an operation of the present invention.

Referring to FIG. 5, a timing diagram 200 of typical waveform signals for the system 100 involving two stations (e.g., station 1 (102a) and station 2 (102b)), where M=N=1 is shown. The timing diagram 200 may illustrate a communication protocol established by two stations. At a time (e.g., 0) the station 1 may receive a local event and be asserted at a transition 202. The local event may keep the signal asserted for a single time period. The station 1 local event may additionally cause the transmit module 122a of the station 1 to be asserted at a transition 204.

The transition 204 may cause the SCC 104 to be asserted at a transition 206, at a time (e.g., 1). The transition 206 may cause the receive module 120a of the station 1 to be asserted at a transition 210 and the receive module 122b of the station 2 to be asserted at a transition 212. The transition 210 may cause the transmit module 122a of the station 1 to be de-asserted at a transition 214. The transition 212 may cause the transmit module 122b of the station 2 to be asserted at a transition 216 since the station 2 has not yet received a local event. The asserted transmit module 122b may cause the SCC 104 to remain asserted.

At a time (e.g., 4) the station 2 may be receive a local event. The station 2 local event may be a last local event. The station 2 local event may cause the station 2 to be asserted at a transition 218. The transition 218 may cause the transmit module 122b of the station 2 to be de-asserted at a transition 220. The transition 220 may cause the SCC 104 to be de-asserted at a transition 222, at a time (e.g., 5).

The station 2 local event may be de-asserted at a transition 224. At a time (e.g., 6) the receive module 120a of the station 1 may be de-asserted in response to the transition 222. Additionally, the de-asserted SCC 104 may cause the receive module 120b of the station 2 to be de-asserted at a transition 228.

The present invention may be used in a communication applications, where a high speed stream of parallel data may need to be broken into smaller pieces of data and transmitted over two or more serial links. Due to the transmission speed and length differences of the serial links, the present invention may be required to align the received data in order to recover the original parallel data. In order to aid in the alignment process, special characters (or sequence of characters) may be included within the data stream that may indicate to the receiver when to start the alignment of the data. The detection of the special characters is considered as an event local to each station.

Figure 6:
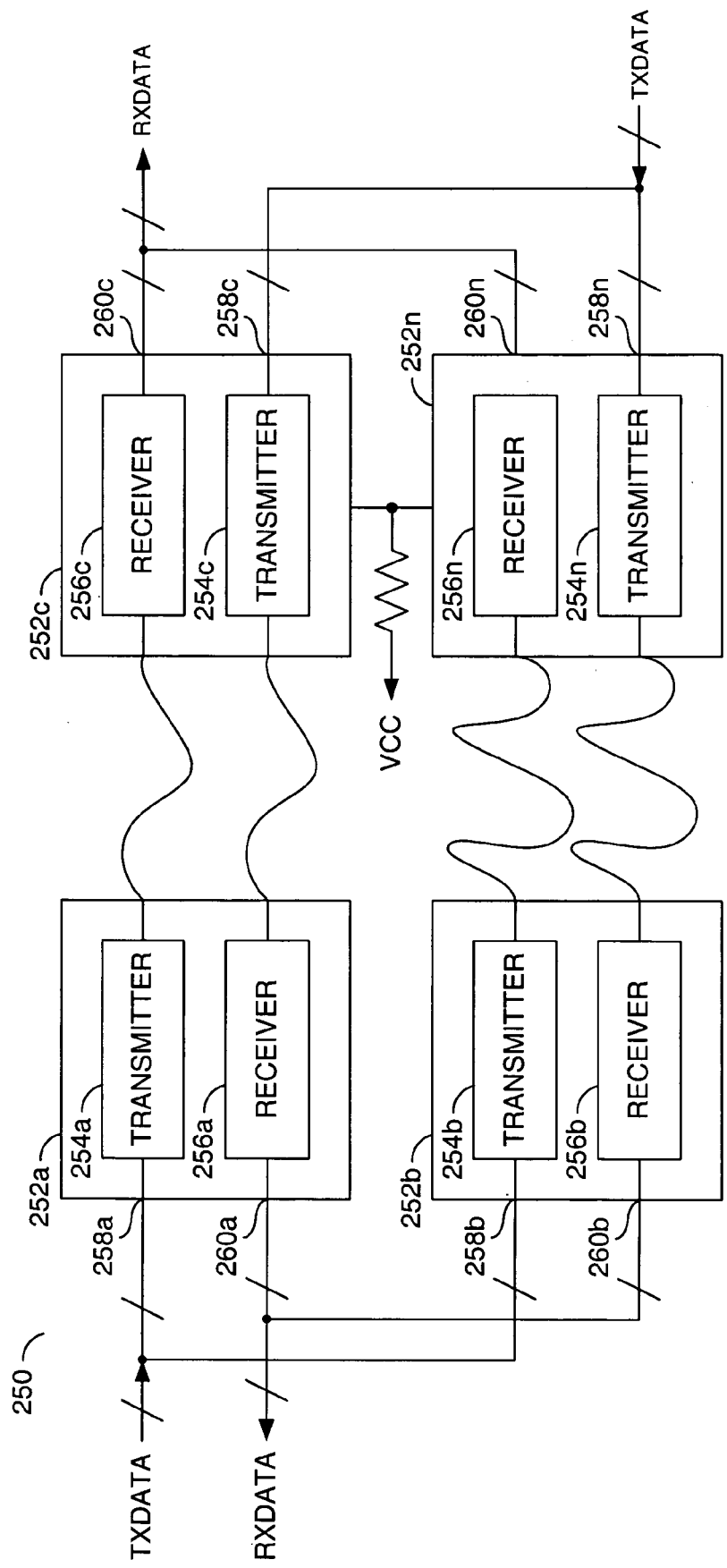
FIG. 6 is a block diagram of an implementation of the present invention.

Referring to FIG. 6, an example of a typical circuit (or system) 250 that may use of the bonding feature of the present invention is shown. The circuit 250 may implement two local and two remote stations. The circuit 250 generally comprises a number of transceiver blocks (or circuits) 252a–252n. Each of the transceiver blocks 252a–252n generally comprises a transmitter 254 and a receiver 256. Each of the transmitters 254a–254n may have an input 258a–258n that may receive a signal (e.g., TXDATA). Each of the receivers 256a–256n may have an output 260a–260n that may present a signal (e.g., RXDATA).

The transceiver blocks 252a–252n blocks may be configured to communicate. For example, the transmitter 254a may be coupled to the receiver 256c and the receiver 256a may be coupled to the transmitter 254c. Additionally, the transmitter 254b may be coupled to the receiver 256n and the receiver 256b may be coupled to the transmitter 254n. The couplings of the receivers 256a–256n and the transmitters 254a–254n may be implemented as serial links. The serial links may have different lengths and/or transmission speed characteristics.

Figure 7:
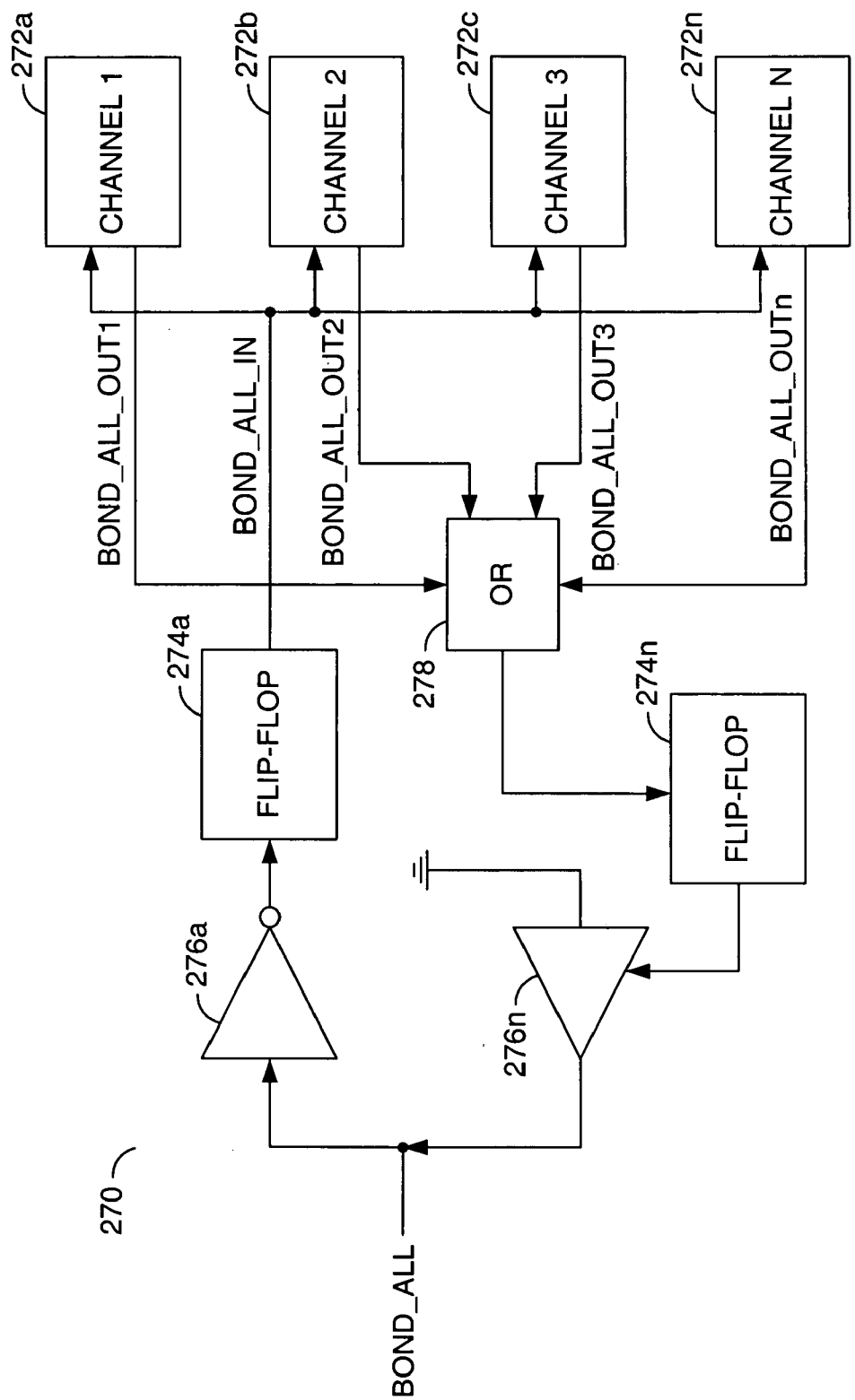
FIG. 7 is a block diagram of an implementation of the present invention.

Referring to FIG. 7, another example of a typical circuit (or system) 270 that may require the use of the bonding feature of the present invention is shown. The circuit 270 may illustrate a receive module of a typical station. The circuit 270 generally comprises a number of channels 272a–272n, a number of memory elements 274a–274n, a number of buffers 276a–276n and a logic block 278. In one example the logic block 278 may be implemented as an OR logic block and the memory elements 274a–274n may be implemented as flip-flops. However, the logic block 278 and the memory elements 274a–274n may be implemented as other appropriate devices in order to meet the criteria of a particular implementation. The following table shows an exemplary operation of the circuit 270:

| CASE 1 | | | | | | | |
|---|---|---|---|---|---|---|---|
| CLK | 1 | 2 | 3 | 4 | 5 | 6 | 7 |
| SYNC | 1 | 0 | 0 | 0 | 0 | 0 | 0 |
| BOND_ALL_OUT | 1 | 1 | 0 | 0 | 0 | 0 | 0 |
| BOND_ALL_IN | 0 | 0 | 1 | 1 | 1/0 | 1/0 | 0 |
| CASE 2 | | | | | | | |
| CLK | 1 | 2 | 3 | 4 | 5 | 6 | 7 |
| SYNC | 1 | 0 | 0 | 0 | 0 | 0 | 0 |
| BOND_ALL_OUT | 1 | 0 | 0 | 0 | 0 | 0 | 0 |
| BOND_ALL_IN | 0 | 1 | 1 | 1/0 | 0 | 0 | 0 |
| CASE 3 | | | | | | | |
| CLK | 1 | 2 | 3 | 4 | 5 | 6 | 7 |
| SYNC | 1 | 0 | 0 | 0 | 0 | 0 | 0 |
| BOND_ALL_OUT | 0 | 0 | 0 | 0 | 0 | 0 | 0 |
| BOND_ALL_IN | 1 | 1 | 1 | 0 | 0 | 0 | 0 |
| CASE 4 | | | | | | | |
| CLK | 1 | 2 | 3 | 4 | 5 | 6 | 7 |
| SYNC | 0 | 1 | 0 | 0 | 0 | 0 | 0 |
| BOND_ALL_OUT | 1 | 0 | 0 | 0 | 0 | 0 | 0 |
| BOND_ALL_IN | 1 | 1 | 1 | 0 | 0 | 0 | 0 |
| CASE 5 | | | | | | | |
| CLK | 1 | 2 | 3 | 4 | 5 | 6 | 7 |
| SYNC | 0 | 0 | 1 | 0 | 0 | 0 | 0 |
| BOND_ALL_OUT | 1 | 1 | 0 | 0 | 0 | 0 | 0 |
| BOND_ALL_IN | 1 | 1 | 1 | 1 | 0 | 0 | 0 |

Figure 8:
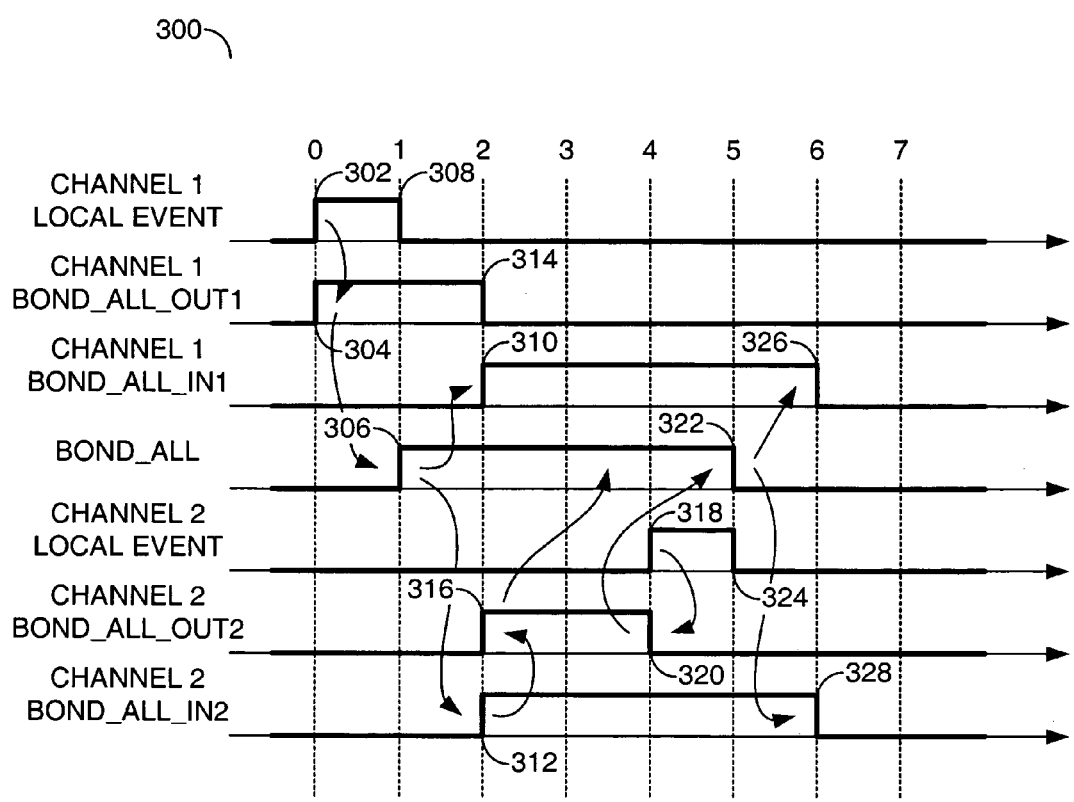
FIG. 8 is a timing diagram of the circuit of FIG. 7.

Referring to FIG. 8, a timing diagram 300 of typical waveform signals for the system of FIG. 7 involving two channels (e.g., channel 1 (272a) and channel 2 (272b)) is shown. The timing diagram 300 may illustrate a communication protocol established by two stations detailing the timing of internal nodes of the system FIG. 7. At a time (e.g., 0) the channel 1 may receive a local event and be asserted at a transition 302. The transition 302 may keep the local event asserted for a single time period. The transition 302 may additionally cause a signal (e.g., BOND_ALL_OUT) of the channel 1 to be asserted at a transition 304.

The transition 304 may cause a signal (e.g., BOND_ALL) to be asserted at a transition 306, at a time (e.g., 1). Once the signal BOND_ALL is active, the channel 1 local event may be de-asserted at a transition 308. The signal BOND_ALL may cause a signal (e.g., BOND_ALL_IN1) of the channel 1 to be asserted at a transition 310 and a signal (e.g., BOND_ALL_IN2) of the channel 2 to be asserted at a transition 312. The signal BOND_ALL_IN1 may cause the signal BOND_ALL_OUT1 to be de-asserted at a transition 314. The signal BOND_ALL_IN2 may cause the signal BOND_ALL_OUT2 to be asserted at a transition 316. The asserted signal BOND_ALL_OUT2 may cause the signal BOND_ALL to remain asserted.

At a time (e.g., 4) the channel 2 may be receive a local event. The channel 2 local event may be a last local event. The channel 2 local event may cause the channel 2 to be asserted at a transition 318. The transition 318 may cause the signal BOND_ALL_OUT2 to be de-asserted at a transition 320. The transition 320 may cause the signal BOND_ALL to be de-asserted at a transition 322 at a time (e.g., 5).

The channel 2 local event may be de-asserted at a transition 324. At a time (e.g., 6) a signal (e.g., BOND_ALL_IN1) may be de-asserted in response to the transition 322. Additionally, the transition 322 may cause a signal (e.g., BOND_ALL_IN2) to be de-asserted at a transition 328.

The system 100 may be implemented to pass timing information to peer transceivers, which may or may not be located in the same integrated circuit (IC). The system 100 may achieve data alignment across channels (or across devices), in the presence of a wide skew of arrival times of local events (e.g., special character sequences). The system 100 may achieve data alignment across different frequencies. Additionally, other point-to-point communication devices may also implement the circuit 100 to achieve alignment functionality. The circuit 100 illustrates an electric communication media for information broadcast however, the circuit 100 may also be applied to signal transmissions via electromagnetic and/or sound waves.

The protocol 100 may allow a single shared communication channel (e.g., the shared communication channel 104) to broadcast timing information to a number of peer stations. Normal methods for broadcasting timing information implement two or more communication channels that may require additional hardware resources (e.g., I/O pins, drivers, communication channels and delay elements). The additional hardware elements may increase overall power consumed of the device. The circuit 100 may allow a reduced cost, power consumption and area. However, each of the stations 102a–102n may require a minimal amount of additional logic in order to process the timing information.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    one or more stations each configured to (i) receive local events from a local input and (ii) present broadcast timing information over a shared communication channel, wherein said one or more stations are each configured to (i) present said broadcast timing information comprising (a) a first synchronous local event and (b) a last synchronous local event and (ii) share said broadcast timing information with each of said other stations over said shared communication channel; wherein (i) each station further comprises a receive time delay circuit having a delay time of M and a transmit time delay circuit having a delay time of N and (ii) a propagation delay through the shared communication channel between any two of the stations is less than one clock cycle.

2. The apparatus according to claim 1, wherein said apparatus comprises a communication protocol.

3. The apparatus according to claim 1, wherein said timing information is configured to distinguish between a first local event and a last local event from said stations.

4. The apparatus according to claim 1, wherein each of said one or more stations is further configured to receive one or more local events.

5. The apparatus according to claim 4, wherein each of said one or more stations each further comprise a plurality of buffers.

6. The apparatus according to claim 1, wherein each of said one or more stations comprise:
    a receive module configured to receive said broadcast timing information; and
    a transmit module coupled to said communication channel.

7. The apparatus according to claim 6, wherein each of said one or more transmit modules is configured to present said broadcast timing information.

8. The apparatus according to claim 6, wherein each of said one or more stations further comprise one or more delay circuits.

9. The apparatus according to claim 8, wherein at least one of said one or more delay circuits comprises a receive time delay circuit.

10. The apparatus according to claim 8, wherein at least one of said one or more delay circuits comprises a transmit time delay circuit.

11. The apparatus according to claim 1, further comprising:
    a plurality of transceiver circuits configured to receive and transmit said broadcast timing information from said communication channel to said stations through one or more serial links.

12. An apparatus comprising:
    means for (i) receiving local events from a local input for each of one or more stations and (ii) presenting broadcast event timing information over a shared communication channel; and
    means for sharing said broadcast event timing information between said stations, wherein said broadcast event timing information comprises (a) a first synchronous local event and (b) a last synchronous local event shared over said shared communication channel; wherein (i) each station further comprises a receive time delay circuit having a delay time of M and a transmit time delay circuit having a delay time of N and (ii) a propagation delay through the shared communication channel between any two of the stations is less than one clock cycle.

13. A method for sharing event detection information comprising the steps of:
    (A) receiving local events from a local input for each of one or more stations;
    (B) generating broadcast timing information in response to said local events; and
    (C) sharing said broadcast timing information between said stations, wherein said broadcast timing information comprises (a) a first synchronous local event and (b) a last synchronous local event shared over a shared communication channel;
    wherein (i) each station further comprises a receive time delay circuit having a delay time of M and a transmit time delay circuit having a delay time of N and (ii) a propagation delay through the shared communication channel between any two of the stations is less than one clock cycle.

14. The method according to claim 13, further comprising the step of:
    receiving one or more local event signals.

15. The method according to claim 13, wherein step (B) is further configured in response to said local events.

16. The method according to claim 13, wherein step (B) comprises the sub-steps of:
    (B-1) receiving said broadcast timing information; and
    (B-2) transmitting said broadcast timing information.

17. The method according to claim 13, wherein step (B) further comprises:
    sharing said event detection information within a time window.

18. The method according to claim 13, wherein step (B) further comprises:
    acknowledging said event detection information.

19. The method according to claim 13, wherein step (B) further comprises:
    determining a first and last local event.

* * * * *